US010298313B2

(12) United States Patent
Liu et al.

(10) Patent No.: US 10,298,313 B2
(45) Date of Patent: May 21, 2019

(54) SYSTEMS AND METHODS FOR SELECTING A DONOR FOR A RELAY WIRELESS DEVICE

(71) Applicant: Sprint Spectrum LP, Overland Park, KS (US)

(72) Inventors: Chunmei Liu, Great Falls, VA (US); Hemanth Pawar, Brambleton, VA (US); Krishna Sitaram, Chantilly, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 86 days.

(21) Appl. No.: 15/263,865

(22) Filed: Sep. 13, 2016

(65) Prior Publication Data
US 2018/0076877 A1    Mar. 15, 2018

(51) Int. Cl.
*H04B 7/155*    (2006.01)
*H04W 28/08*    (2009.01)

(52) U.S. Cl.
CPC ......... *H04B 7/15507* (2013.01); *H04W 28/08* (2013.01)

(58) Field of Classification Search
CPC ............ H04B 7/15528; H04B 7/15507; H04B 7/15542; H04B 7/14; H04B 17/40
See application file for complete search history.

(56) References Cited

U.S. PATENT DOCUMENTS

| 9,820,254 B2 * | 11/2017 | Mochizuki ............ H04W 60/04 |
| 2012/0279346 A1 * | 11/2012 | Canavan ................ B60K 26/02 |
| | | 74/513 |
| 2013/0016648 A1 | 1/2013 | Koskela et al. |
| 2013/0279346 A1 * | 10/2013 | Zhang ................... H04W 24/08 |
| | | 370/241.1 |
| 2015/0078162 A1 | 3/2015 | Prakash et al. |

* cited by examiner

*Primary Examiner* — Ayaz R Sheikh
*Assistant Examiner* — Debebe A Asefa (57) ABSTRACT

Exemplary embodiments described herein include systems, methods, and nodes for selecting a donor for a relay wireless device. Signal levels corresponding to signals received at a relay wireless device from a plurality of access points are determined. Signal information is received from the plurality of access points, wherein the signal information comprises a group identification for each access point. The signal information for the access points may then be compared to a donor criteria. And the access point corresponding to the greatest signal level that also comprises signal information that meets the donor criteria may be selected as the donor for the relay wireless device.

20 Claims, 7 Drawing Sheets

SYSTEMS AND METHODS FOR SELECTING A DONOR FOR A RELAY WIRELESS DEVICE

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, latency overhead may cause service degradation (e.g., dropped packets) when backhaul connections to a communication network span numerous communication links and multiple wireless communication links. Accordingly, donor selection for a relay wireless device based on backhaul connection of the donor access point may increase quality of service for users of the communication network.

OVERVIEW

Exemplary embodiments described herein include systems, methods, and nodes for selecting a donor for a relay wireless device. Signal levels corresponding to signals received at a relay wireless device from a plurality of access points are determined. Signal information is received from the plurality of access points, wherein the signal information comprises a group identification for each access point. The signal information for the access points may then be compared to a donor criteria. And the access point corresponding to the greatest signal level that also comprises signal information that meets the donor criteria may be selected as the donor for the relay wireless device.

DETAILED DESCRIPTION

In an embodiment, methods and system are described for selecting a donor for a relay wireless device. For example, a relay wireless device may connect a small cell to an access node such that the relay wireless device relays backhaul traffic to and from the access node and small cell. However, backhaul connections that span multiple wireless links may present additional service challenges. For example, traversing too many wireless links over a backhaul connection to gain access to a communication network may not be compatible with latency requirements for certain types of traffic. Accordingly, it may be beneficial to select a donor access point based on backhaul connection to the communication network such that excessive wireless connections can be avoided. In an embodiment, group information for an access point (e.g., a tracking area code) may be used to indicate a type of backhaul connection. When a donor access point is being selected for a relay wireless device, the tracking area code for a candidate donor access point may be compared to a criteria to determine the backhaul connection type. Subsequently, a donor access point may be selected based on the comparison, in addition to other factors, such as signal level measurements for signals from the access points received at the relay wireless device.

Figure 1:
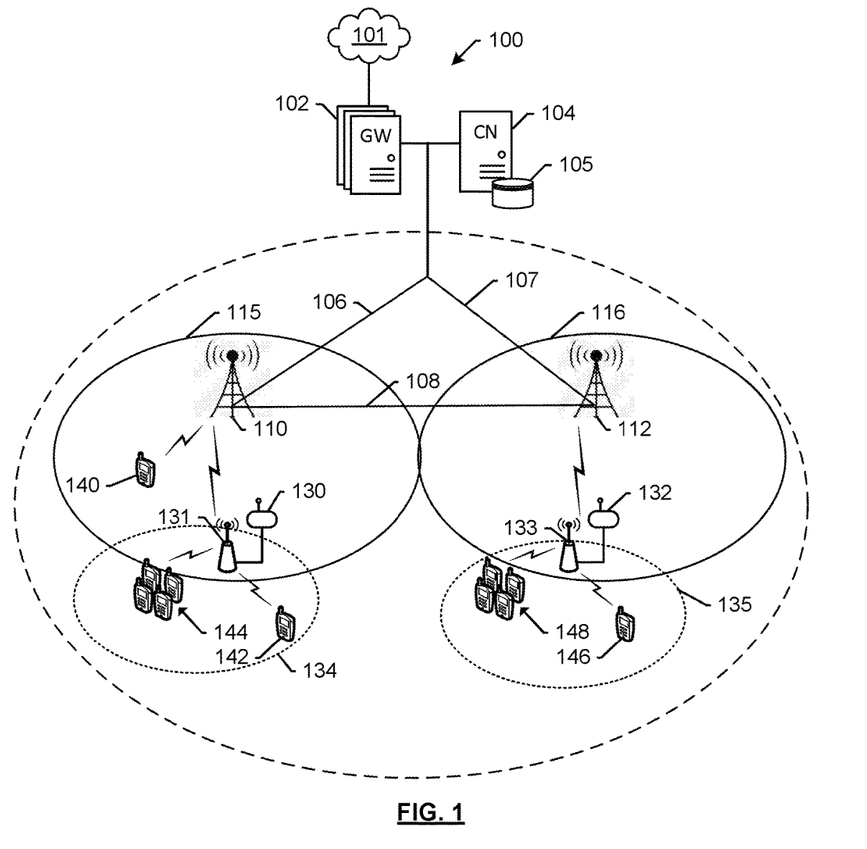
FIG. 1 depicts an exemplary system for selecting a donor for a relay wireless device.

FIG. 1 depicts an exemplary system 100 for selecting a donor for a relay wireless device. System 100 comprises a communication network 101, gateway nodes 102, controller node 104, access nodes 110 and 112, relay wireless devices 130 and 132, and wireless devices 140, 142, 144, 146, and 148, which may comprise end-user wireless devices. In this embodiment, access node 110 provides services to wireless devices 142 and 144 via relay access node that comprises a combination of relay wireless device 130 and small cell 131, which may comprise a relay access point or node, and access node 112 provides services to wireless devices 146 and 148 via relay access node that comprises a combination of relay wireless device 132 and small cell 133, which may comprise a relay access point or node. Consequently, access nodes 110 and 112 may be referred to as donor access nodes. Relay wireless device 130 is thus configured to relay services from access node 110 to wireless devices 142 and 144 and relay wireless device 132 is thus configured to relay services from access node 112 to wireless devices 146 and 148.

In an embodiment, to achieve this, relay wireless devices 130 and 132 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131, and relay wireless device 132 may be communicatively coupled to small cell 133. Small cells 131 and 133 may include a mini-macro, picocell, femtocell, or the like that are capable of providing a wireless access point for wireless devices 142, 144, 146, and 148, of which wireless devices 142 and 146 comprise a cluster of wireless devices. Access node 110 is illustrated as having coverage area 115, access node 112 is illustrated as having coverage area 116, small cell 131 is illustrated as having coverage area 134, small cell 133 is illustrated has having coverage area 135. Relay wireless devices 130 and 132 are located within coverage area 115. Wireless devices 140 is located within coverage area 115, wireless devices 142 and 144 are located outside coverage area 115 but within coverage area 134 of small cell 131, and wireless devices 146 and 148 are located outside coverage area 115 but within coverage area 135 of small cell 133. As a consequence, cluster of wireless devices 142 may access network services using the combination of relay wireless device 130 and small cell 131, rather than overload access node 110, which may be serving numerous other devices, such as wireless device 140. Wireless devices 146 and 148 may similarly access network services using relay wireless device 132 and small cell 133. Moreover, wireless device 144 that is outside coverage area 115 may access network services from access node 110 by virtue of being connected to relay wireless device 130 via small cell 131.

In an embodiment, relay wireless devices 130 and 132 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access nodes 110 and/or 112 are amplified and transmitted by relay wireless devices 130 and 132 to one or more of wireless devices 142, 144, 146, and 148. Likewise, RF signals received from wireless devices 142, 144, 146, and 148 are amplified and transmitted by relay wireless device 130 and 132, respectively, to either access node 110 or access node 112. Alternatively or in addition, a layer 2 relay device performs a decode and forward (DF) function. RF signals received from access node 110 or 112 are demodulated and decoded, then encoded and modulated again before being transmitted by relay wireless devices 130 and 132 to one or more of wireless devices 142, 144, 146, and 148. Likewise, RF signals received from one or more of wireless devices 142, 144, 146, and 148 are demodulated and decoded, then encoded and modulated again before being transmitted by relay wireless devices 130 and 132 to access node 110 or 112. Alternatively or in addition, a layer 3 relay device also performs a decode and forward function. However, a layer 3 relay device also performs additional processing (such as ciphering and/or data concatenation/segmentation/resassembly). In other words, relay wireless devices 130 and 132 may perform demodulation and decoding of the received RF signals (either uplink or downlink), processing of the received data, then encode, modulate, and transmit the data to one or more of wireless devices 142, 144, 146, and 148.

Relay wireless devices 130 and 132, and wireless devices 140, 142, 144, 146, and 148, may be any device, system, combination of devices, or other such communication platform capable of communicating wirelessly with access node 110 using one or more frequency bands deployed by access node 110. Relay wireless devices 130 and 132, and wireless devices 140, 142, 144, 146, and 148 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless devices 130 and 132 include stronger computational & radiofrequency capabilities than an average wireless device, as well as a directional antenna, and dedicated power supply, so that they can sustain an over-the-air backhaul link for wireless devices 142, 144, 146, and 148 that attach to small cells 131, and 133, respectively.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless devices 130 and 132, and wireless devices 140, 142, 144, 146, and 148. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107, and 108 can use various communication media, such as air, space, metal, optical fiber, or some other signal propagation path—including combinations thereof. Communication links 106, 107, and 108 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication links 106 and 107 may include S1 communications links and communication link 108 may comprise an X2 communication link. Other wireless protocols can also be used. Communication links 106, 107, and 108 can be a direct link or might include various equipment, intermediate components, systems, and networks. Communication links 106, 107, and 108 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless devices 130 and 132, as well as a UE S-GW/P-DW combination for providing gateway services to one or more of wireless devices 140, 142, 144, 146, and 148. In embodiments, data packets such as voice over IP (VoIP) data packets may be routed from one or more of relay wireless devices 130 and 132, and wireless devices 140, 142, 144, 146, and 148 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access nodes 110 and 112 can be any network node configured to provide communication between relay wireless devices 130 and 132, and wireless devices 140, 142, 144, 146, and 148, and communication network 101. Access nodes 110 and 112 can be a macrocell access node such as a base transceiver station, a radio base station, an eNodeB device, or an enhanced eNodeB device, or the like. In an exemplary embodiment, a macrocell access node can have a coverage area 115 or 116 in the range of approximately five kilometers to thirty five kilometers and an output power in the tens of watts.

Small cells 131 and 133 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access nodes 110 and 112, and small cells 131 and 133 are illustrated in FIG. 1, any number of access nodes and/or small cells can be implemented within system 100.

Access node 110 and 112 and small cells 131 and 133 can comprise a processor and associated circuitry to execute or direct the execution of computer-readable instructions to obtain information. Access node 110 and 112 and small cells 131 and 133 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and 112 and small cells 131 and 133 can receive instructions and other input at a user interface. Access node 110 communicates with gateway nodes 102 and controller node 104 via communication link 106, access node 112 communicates with gateway nodes 102 and controller node 104 via communication link 107, and access node 110 communications with access node 112 over communication link 108. Operations performed by one or all of access node 110 and 112 and small cells 131 and 133 are further described herein with reference to FIGS. 4 and 6.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
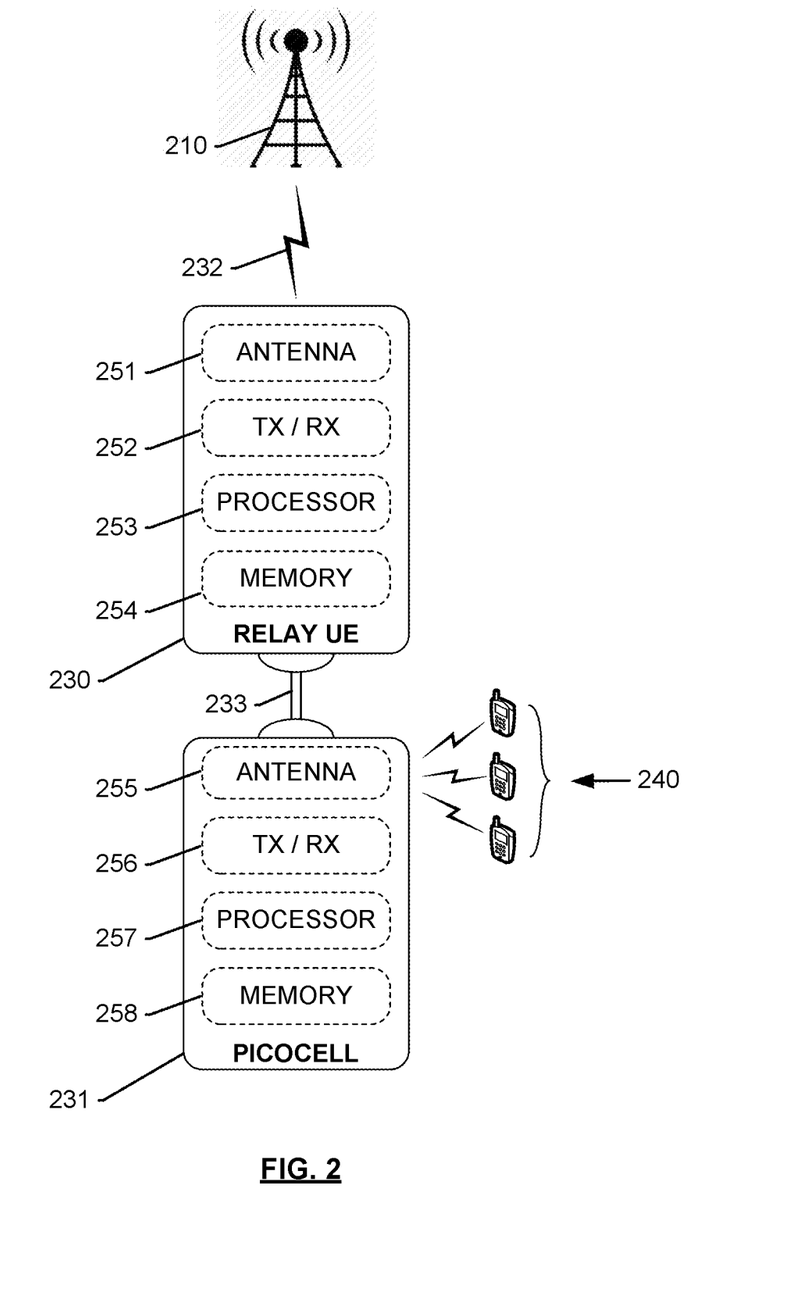
FIG. 2 depicts an exemplary relay wireless device coupled to a small cell.

FIG. 2 depicts an exemplary relay wireless device 230, or relay user equipment (UE), coupled to a small cell 231, or picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240 via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless device 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 (e.g., end-user wireless device) via small cell 231. Relay wireless device 230 may begin to function as a relay by sending a message to access node 210 to indicate to access node 210 that relay wireless device 230 is functioning as a relay. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report may be associated with a logical channel group that indicates the buffer status report is communicating the status of the UE as a relay, and thus is not asking for additional resource allocations (like a 'conventional' buffer status report would indicate). In other words, in some embodiments, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
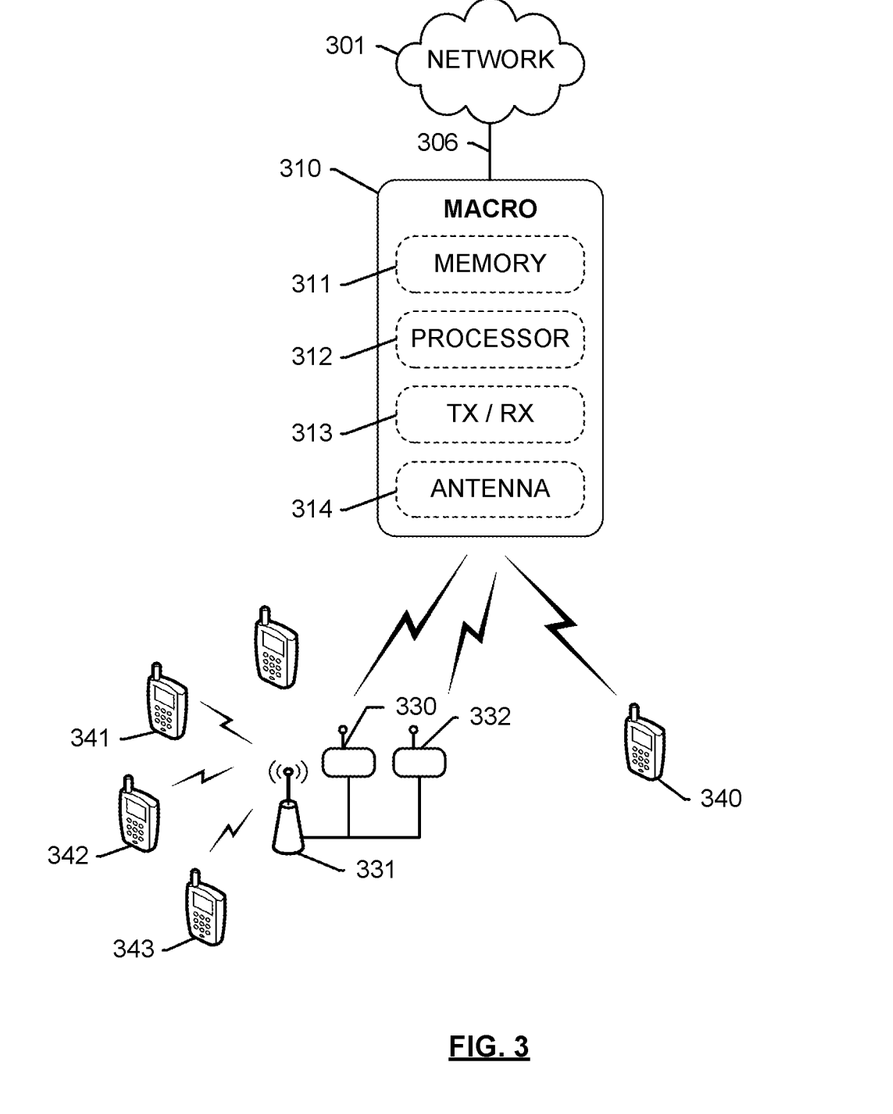
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as one or both of relay wireless devices 330 and 332. Here, access node 310 provides access to network services from network 301 to wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

As illustrated, relay wireless devices may overlap with coverage areas 115 and 116 of access nodes 110 and 112, such as relay wireless devices 130 and 132. In an embodiment, tracking areas may be used to track and page wireless devices (e.g., wireless devices 142, 144, 146, and 148, which may comprise end-user wireless devices). A wireless device can enter into a lower power state, such as an idle mode or a sleep mode, in which the wireless device is not in continuous communication with an access point. Nevertheless, communication system 100 may maintain a record of a recent location of the wireless device in order to route paging messages, for example, if data is sent to the wireless device. In an example, if an incoming call is received for the wireless device, the wireless device may be paged such that a connection can be secured to execute the call.

One method of maintaining a record of a recent location of a wireless device is by use of a tracking area. A tracking area consists of a group of access nodes or access nodes within a geographic area which are associated with a tracking area code. In an embodiment, communication network 100 maintains a record of the access node that a wireless device communicated with most recently, as well as the associated tracking area code, and thus the associated tracking area, of that access node. The wireless device can be considered to be within the tracking area associated with the most recent access node. When a message such as data arrives for the wireless device, a paging message is sent to the access node most recently in communication with the wireless device. When the wireless device does not respond to the paging message within a predetermined period of time, a paging message is sent to the access nodes in the tracking area.

Further, tracking area codes are typically broadcast from an access point (e.g., in an LTE SIB1 message) such that wireless devices may appropriately determine that tracking area in which it resides. Because the tracking area comprises a group of access points and is readily available to wireless devices via the broadcast messages, tracking areas may be leveraged to aid in donor access point selection. In particular, a relay wireless device may compare a tracking area code for an access point with a donor criteria when selecting a donor access point. As such, tracking areas may be leveraged to reduce latency risks when communicating with a communication network via a relay wireless device.

Figure 4:
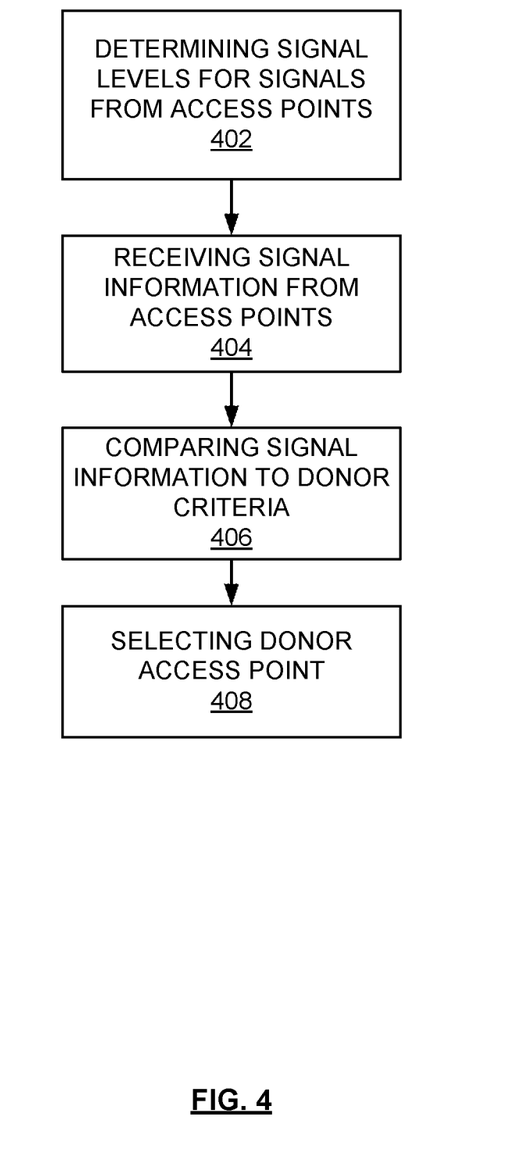
FIG. 4 depicts an exemplary method for selecting a donor for a relay wireless device.

FIG. 4 illustrates an exemplary method for selecting a donor for a relay wireless device according to an embodiment. The method will be discussed with reference to the exemplary communication system 100 illustrated in FIG. 1, however, the method can be implemented with any suitable communication system.

Referring to FIG. 4, at step 402, signals levels may be determined for signals from a plurality access points. For example, signals levels for signals received from access nodes 110 and 112 and small cells 131 and 133 at a relay wireless device (not illustrated) may be determined. The signal levels may comprise signal to noise plus interference ratio (SINR), received signal strength indicator (RSSI), reference signal received quality (RSRQ), received signal received power (RSRP), and the like.

At step 404, signal information may be received from a plurality of access points, wherein the signal information comprises a group identification for each access point. In an embodiment, a relay wireless device may be searching for a donor access point. Access nodes 110 and 112 and small cells 131 and 133 may comprise candidates for the donor access point. As such, signal information may be received from each candidate access point that comprises a group identification for each candidate. In an embodiment, the group identification may comprise a tracking area code.

At step 406, the received signal information may be compared to donor criteria. For example, group identifications for access nodes 110 and 112 and small cells 131 and 133 may be compared to a donor criteria, where group identifications for access points with wireless backhauls do not meet the donor criteria.

At step 408, an access point donor may be selected for the relay wireless device. For example, among access nodes 110 and 112 and small cells 131 and 133, the access point that corresponds to the highest received signal level and that also comprises signal information that meets the donor criteria may be selected as the donor access point.

Figure 5:
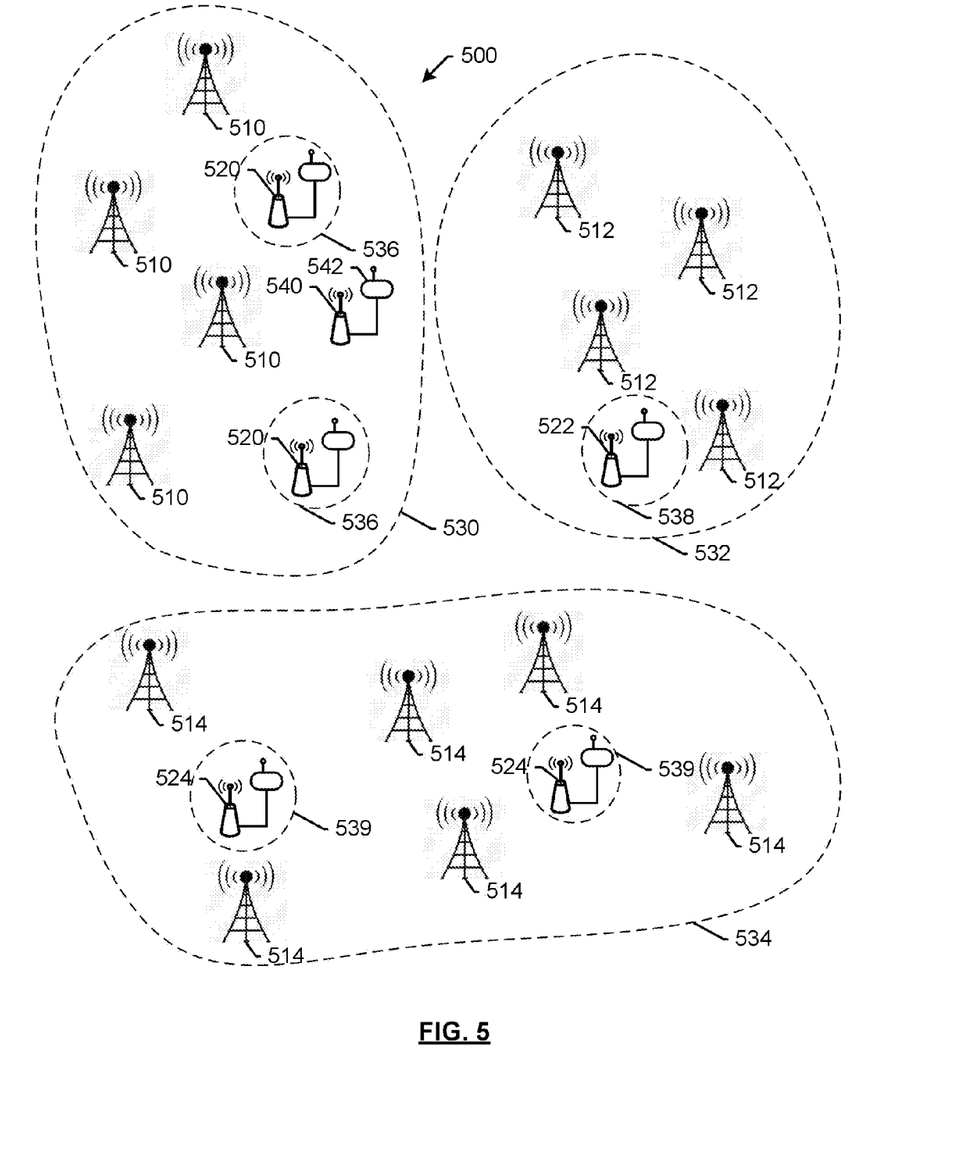
FIG. 5 depicts another exemplary system for selecting a donor for a relay wireless device.

FIG. 5 depicts an exemplary system 500 for selecting a donor for a relay wireless device. System 500 comprises access nodes 510, 512, and 514, small cells 520, 522, 524, and 540, relay wireless device 542, and tracking areas 530, 532, 534, 536, 538, and 539. Access nodes 510, 512, and 514 may be similar to access nodes 110 and 112 of FIG. 1. Similarly, small cells 520, 522, 524, and 540 may be similar to small cells 131 and 133 of FIG. 1 and relay wireless device 542 may be similar to relay wireless devices 130 and 132 of FIG. 1. In an embodiment, small cells 520, 522, 524, and 540 may each rely on relay wireless devices to connect to a communication network (e.g., relay backhaul traffic) in order to service (end-user) wireless devices. Access nodes 510, 512, and 514, and small cells 520, 522, 524, and 540 may service a plurality of (end-user) wireless devices.

In an embodiment, system 500 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, tracking areas may be used to track and page wireless devices, as detailed herein. Further, because tracking area codes are typically broadcast from an access point (e.g., in an LTE SIB1 message) such that wireless devices may appropriately determine that tracking area in which it resides, tracking areas may be leveraged to aid in donor access point selection.

In an embodiment, tracking area 530 may comprise access nodes 510 and a plurality of other access points. Similarly, tracking area 532 may comprise access nodes 512 and tracking area 534 may comprise access nodes 514. In an embodiment, as illustrated, tracking areas 530, 532, and 534 may not comprise small cells 520, 522, and 524. Instead, these small cells may be part of tracking areas 536, 538, and 539. Here, the tracking areas may be subdivided based on backhaul links for the access points. In other words, tracking areas 530, 532, and 534 may be reserved for access points that comprise wired links to a communication network (e.g., do not rely on a wireless link, for instance form a relay wireless device, for a backhaul connection), and tracking areas 536, 538, and 539 may be reserved for access points that comprise wireless links to a communication network (e.g., rely on a wireless link, for instance form a relay wireless device, for a backhaul connection). Further, a single tracking area may be assigned to all access points that have wireless connections to a communication network. For example, one of tracking areas 536, 538, or 539 may be assigned to all of small cells 520, 522, and 524.

In some embodiments, a relay wireless device may compare a tracking area code for an access point with a donor criteria when selecting a donor access point to determine a backhaul type for the access point. As such, tracking areas may be leveraged to reduce latency risks when communicating with a communication network via a relay wireless device.

Figure 6:
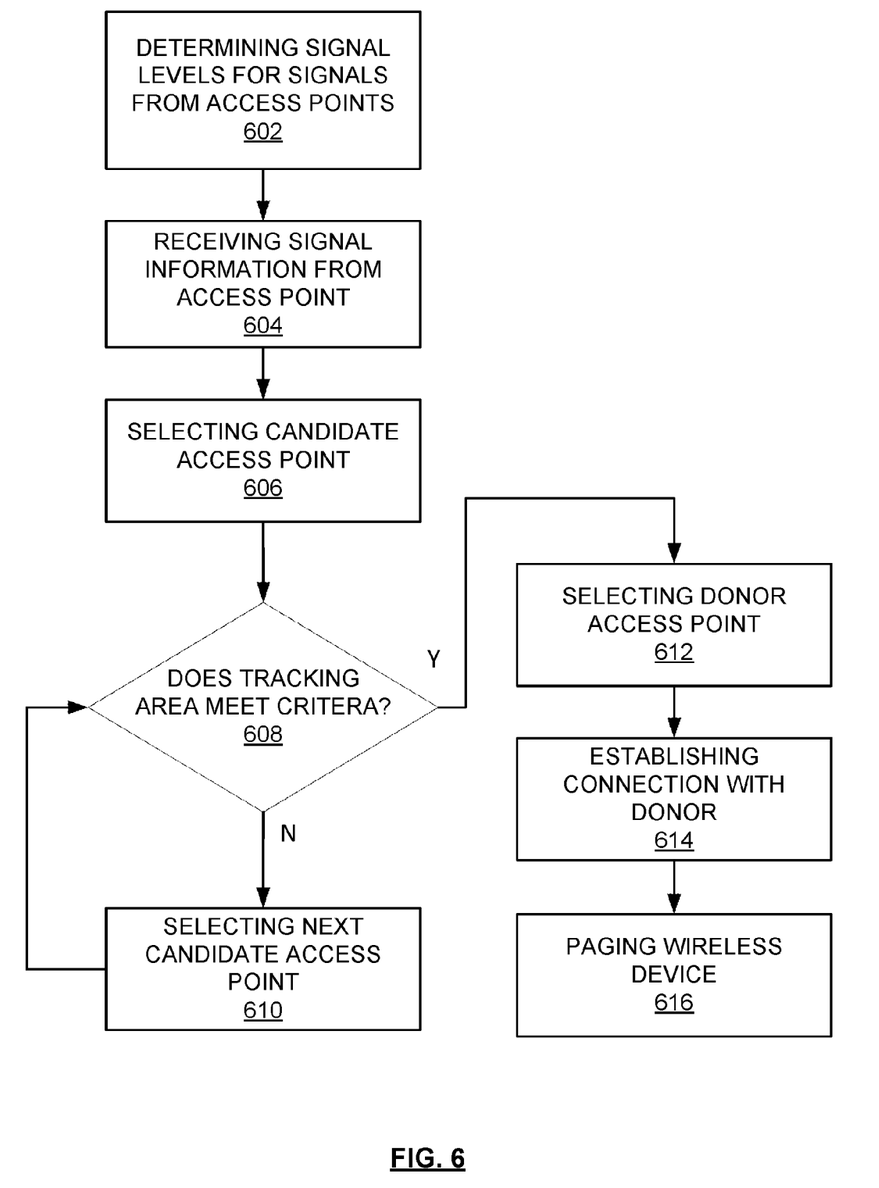
FIG. 6 depicts another exemplary method for selecting a donor for a relay wireless device.

FIG. 6 illustrates an exemplary method for selecting a donor for a relay wireless device according to an embodiment. The method will be discussed with reference to the exemplary communication system 500 illustrated in FIG. 5, however, the method can be implemented with any suitable communication system.

Referring to FIG. 6, at step 602, signals levels may be determined for signals from the candidate access points. For example, signals levels for signals received at small cell 540 and relay wireless device 542 from the subset of access nodes 510 and small cells 546 at relay wireless device 542 may be determined. The signal levels may comprise signal to noise plus interference ratio (SINR), received signal strength indicator (RSSI), reference signal received quality (RSRQ), received signal received power (RSRP), and the like. In an embodiment, the determined signal levels may be communicated from small cell 540 and/or relay wireless device 542 to any other network element performing some or all of the method of FIG. 6.

Referring to FIG. 6, at step 604, signal information may be received from a plurality of access points, wherein the signal information comprises a group identification for each access point. In an embodiment, small cell 540 and relay wireless device 542 may be searching for a donor access point. For instance, relay wireless device 542 may be newly deployed, the relay's previous donor access point may have been moved or adjusted, or some other circumstance may have triggered the relay wireless device to search for a donor access point.

In an embodiment, candidate access points may be determined based on proximity to relay wireless device 542. For instance, based on received signal levels at relay wireless device 542 from a subset of access nodes 510 and small cells 520, these access points may comprise candidates for the donor access point. In an embodiment, signal information may be received from each candidate access point that comprises a group identification for each candidate. For example, each candidate access point may broadcast a message (e.g., LTE SIB1 message) periodically that comprises a tracking area code for the access point. Relay wireless device 542 may receive the broadcast messages from the candidates access points and thus receive their tracking area codes.

At step 606, a candidate access point for the small cell and/or relay wireless device may be selected. For example, a donor access point from among the subset of access nodes 510 and small cells 520 that comprise candidate access points may be selected. In an embodiment, the access point that corresponds to the highest received signal level (e.g., received at relay wireless device 542) may be selected as the candidate access point. For example, the candidate access point from among access nodes 510 and small cells 520 that corresponds to the higher received signal level for a signal received at relay wireless device 542 may be selected as the candidate access point.

At step 608, the received signal information for the selected candidate access point may be compared to donor criteria. For example, the received group identification for the selected candidate access point may be compared to a donor criteria.

In an embodiment, tracking areas 530, 532, and 534 may be reserved for access points with wired backhauls while tracking areas 536, 538, and 539 may be reserved for access points with wireless backhauls, as described herein. Here, a first predetermined set of tracking area codes may be associated with access points that may serve as donor access points while a second predetermined set of tracking area codes may be associated with access points that are not to serve as donor access points. Thus, tracking areas 530, 532, and 534 may comprise tracking area codes from the first predetermined set and tracking areas 536, 538, and 539 may comprise tracking area codes from the second predetermined set of tracking area codes. One or more of the first predetermined set or the second predetermined set may be stored, for instance at a controller node, in a database, or at individual access points.

In some embodiments, the tracking areas of the second predetermined set may be established based on geographic zones for the tracking areas of the first predetermined set. For example, small cells that rely on wireless backhaul within the geographic zone of tracking area 530 may be assigned to a tracking area 536. Tracking areas 532 and 534 may comprise a similar relationship with tracking areas 538, and 539, respectively. Accordingly, tracking areas of the second predetermined set may overlap with tracking areas of the first predetermined set, as illustrated in FIG. 5.

In an embodiment, the donor criteria may comprise one of the first predetermined set or the second predetermined set of tracking area codes. Accordingly, when a tracking area code for a candidate access point meets the criteria (e.g., when the comparison indicates the candidate access point can comprise a donor access point), the candidate access point may be selected as the donor access point. When the tracking area code for a candidate access point fails to meet the criteria (e.g., when the comparison indicates the candidate access point cannot comprise a donor access point), the candidate access point may be removed from consideration for selection as the donor access point. Here, the result of the comparison may indicate a backhaul connection type (e.g., wired or wireless) and thus indicate a risk to latency for backhaul communications. Removing candidate access points that do not meet the criteria mitigates against such latency risks.

In an embodiment, it may be determined whether the selected candidate access point meets the donor criteria. For example, the group identification (e.g., tracking area code) for the selected candidate access point may be compared to the donor criteria (e.g., second predetermined set of tracking area codes) to determine whether selected access point meets the donor criteria (e.g., determine whether the second predetermined set of tracking area codes does not include the tracking area code for the selected candidate access point). When it is determined that the selected candidate access point meets the donor criteria, the method may progress to step 612. When it is determined that the selected candidate access point fails to meet the donor criteria, the method may progress to step 610.

At step 610, a next candidate access point for the small cell and/or relay wireless device may be selected. For example, a next donor access point from among the subset of access nodes 510 and small cells 520 may be selected. In an embodiment, the access point that corresponds to the next highest received signal level (e.g., received at relay wireless device 542) may be selected as the candidate access point.

From step 610, the method may return to step 608 to determine whether the next selected candidate access point comprises a group identification (e.g., tracking area code) that meets the donor criteria. In some embodiments, the method may iterate through the candidate access points over steps 610 and 608, at each iteration selecting the access point with the next highest received signal level, such that the group identification (e.g., tracking area code) of the selected candidate access point of the current iteration is compared with the donor criteria until a candidate access point that meets the donor criteria is found.

In some embodiments, if after iterating through the candidate access points, an access point that meets the donor criteria is not found, a secondary protocol may be implemented. For example, a network administrator may be notified such that an access point that meets the donor criteria may be installed proximate to the relay wireless device (e.g., relay wireless device 542). In another example, one of the candidate access points that does not meet the donor criteria may be selected as a temporary donor access point. On the other hand, when a candidate access point that meets the donor criteria is found, the method may progress to step 612.

At step 612, a donor access point may be selected for the relay wireless device. For example, the selected candidate access point determined to meet the donor criteria may be selected as the donor access point for relay wireless device 542.

At step 614, a connection may be established between the relay wireless device and the donor access point. For example, a connection may be established between relay wireless device 542 and the selected donor access point. Here, the wireless device may connect to the donor access point and transmit an indication that the wireless device comprises a relay wireless devise. Accordingly, the donor access point may assign wireless resources (e.g., one or more data bearers and frequency bands) for communication with the relay wireless device 542. In particular, small cell 540 may relay backhaul traffic to the selected donor access point via relay wireless device 542 such that the small cell may service wireless devices. In an embodiment, because small cell 540 comprises a wireless backhaul and is within a geographic zone for tracking area 530, it may be assigned a tracking area code associated with tracking area 536.

At step 616, a wireless device previously in communication with a small cell may be paged. For example, a wireless device serviced by small cell 540 may change to an idle or lower power state, as discussed herein. Data may arrive at the communication network for the idle or low power state wireless device. For instance, a call may be received at the communication network for the wireless device. Accordingly, a paging message may be transmitted by small cell 540. If the wireless device does not respond to the paging message within a predetermined period of time, a paging message may be transmitted over tracking area 536. However, because tracking area 536 is one of the second predetermined tracking areas (e.g., comprising access points with wireless backhaul), it may be known that this tracking area overlaps the geographic region of another tracking area. Here, it may be determined (e.g., retrieved from memory) that the overlapping tracking area is tracking area 530. Accordingly, when a paging message is sent over one of the second predetermined tracking area codes (e.g., tracking area 536), a paging message may simultaneously be sent over the overlapping tracking area (e.g., tracking area 530). In some embodiments, the wireless device may respond to the paging message, and a connection may be established with the wireless device.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateway nodes 102, and/or network 101.

Figure 7:
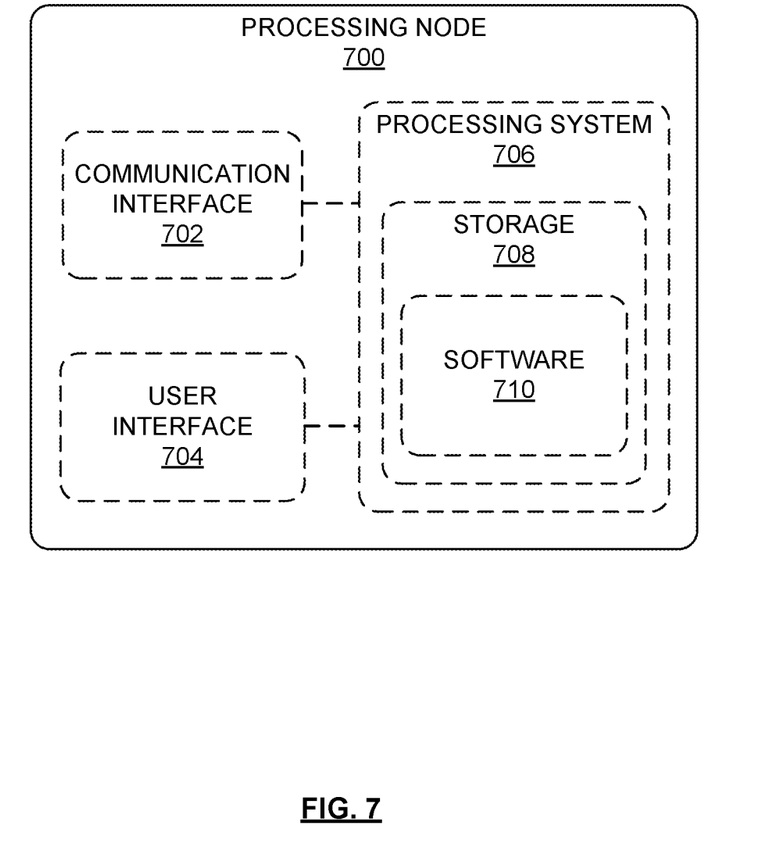
FIG. 7 depicts an exemplary processing node.

FIG. 7 depicts an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. For example, software 710 may include modules for perform the operations described with reference to FIGS. 4 and 6. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor for a relay wireless device, the method comprising:
   determining signal levels corresponding to signals received at a relay wireless device from a plurality of access points; and
   receiving signal information from the plurality of access points, wherein the signal information comprises a group identification for each access point, wherein the group identification corresponds to a geographic area and a backhaul connection type;
   comparing the signal information for the access points to a donor criteria, wherein the donor criteria corresponds to a wired backhaul connection type;
   selecting, as the donor for the relay wireless device, the access point corresponding to:
      the greatest signal level among the plurality of access points, and signal information that meets the donor criteria; and
   instructing the relay wireless device to communicate with the donor access point.

2. The method of claim 1, wherein the received signal information is received based on a broadcast message transmitted from each access point periodically.

3. The method of claim 2, wherein the broadcast messages comprises an LTE SIB message.

4. The method of claim 2, wherein the plurality of access points comprise a first set of the access points with wired backhaul connections to a communication network and a second set of the access points with wireless backhaul connections to the communication network.

5. The method of claim 1, wherein the group identification comprises a tracking area code for the access points.

6. The method of claim 5, wherein comparing the signal information for the access points to a donor criteria further comprises:
   selecting a candidate access point corresponding to the highest signal level from among the plurality of access points; and
   comparing the tracking area code for the selected access point to the donor criteria, the donor criteria comprises a predetermined set of tracking area codes that indicate access points with wired backhaul.

7. The method of claim 6, further comprising:
   when the selected candidate access point does not meet the donor criteria, iteratively selecting candidate access points corresponding to a next highest signal level from among the plurality of access points, and iteratively comparing the tracking area code for the iteratively selected candidate access point to the donor criteria until an access point that meets the donor criteria is selected.

8. The method of claim 6, wherein an access point meets the donor criteria when the tracking area code for the access point is contained within the predetermined set of tracking area codes.

9. The method of claim 8, further comprising assigning a small cell connected to the relay wireless device to one of the predetermined set of tracking area codes.

10. The method of claim 6, wherein at least a portion of the tracking areas that correspond to the predetermined set of tracking area codes comprise geographic areas that overlap with tracking areas that do not correspond to the predetermined set of tracking area codes.

11. The method of claim 10, further comprising paging a wireless device within one of the tracking areas that corresponds to the predetermined set of tracking areas such that the wireless device is paged simultaneously in a tracking area that does not correspond to the predetermined set of tracking area codes and that overlaps with the one tracking area.

12. A system for selecting a donor for a relay wireless device, the system comprising:
   an access point with a processor configured to:
      determine signal levels corresponding to signals received at a relay wireless device from a plurality of access points; and receive signal information from the plurality of access points, wherein the signal information comprises a group identification for each access point, wherein the group identification corresponds to a geographic area and a backhaul connection type;

compare the signal information for the access points to a donor criteria, wherein the donor criteria corresponds to a wired backhaul connection type;

select, as the donor for the relay wireless device, the access point corresponding to:
- the greatest signal level among the plurality of access points, and
- signal information that meets the donor criteria; and instruct the relay wireless device to communicate with the donor access point.

13. The system of claim 12, wherein the received signal information is received based on a broadcast message transmitted from each access point periodically.

14. The system of claim 13, wherein the broadcast messages comprises an LTE S1B message.

15. The system of claim 13, wherein the plurality of access points comprise a first set of the access points with wired backhaul connections to a communication network and a second set of the access points with wireless backhaul connections to the communication network.

16. The system of claim 12, wherein the group identification comprises a tracking area code for the access points.

17. The system of claim 16, wherein comparing the signal information for the access points to a donor criteria further comprises:
- selecting a candidate access point corresponding to the highest signal level from among the plurality of access points; and
- comparing the tracking area code for the selected access point to the donor criteria, the donor criteria comprises a predetermined set of tracking area codes that indicate access points with wireless backhaul.

18. The system of claim 17, wherein the access point is further configured to:
- when the selected candidate access point does not meet the donor criteria, iteratively select candidate access points corresponding to a next highest signal level from among the plurality of access points, and iteratively compare the tracking area code for the iteratively selected candidate access point to the donor criteria until an access point that meets the donor criteria is selected.

19. The system of claim 17, wherein an access point meets the donor criteria when the tracking area code for the access point is contained within the predetermined set of tracking area codes.

20. The system of claim 19, wherein the access point is further configured to assign a small cell connected to the relay wireless device to one of the predetermined set of tracking area codes.

* * * * *